United States Patent [19]

Couture

[11] Patent Number: 4,936,041
[45] Date of Patent: Jun. 26, 1990

[54] FISHING LURE

[75] Inventor: Brian B. Couture, Owen Sound, Canada

[73] Assignee: Brian Couture Enterprises Incorporated, Owen Sound, Canada

[21] Appl. No.: 362,933

[22] Filed: Jun. 8, 1989

[30] Foreign Application Priority Data

Dec. 29, 1988 [CA] Canada ................................ 587223

[51] Int. Cl.⁵ .............................................. A01K 85/00
[52] U.S. Cl. .................................... 43/42.15; 43/42.5; 43/42.18
[58] Field of Search ................. 43/42.15, 42.11, 42.14, 43/42.18, 42.17, 42.5, 42.52

[56] References Cited

U.S. PATENT DOCUMENTS

| | | | |
|---|---|---|---|
| 2,608,787 | 9/1952 | Krogue | 43/42.51 |
| 2,835,067 | 5/1958 | Tidwell | 43/42.5 |
| 2,895,253 | 7/1958 | Hess | 43/42.51 |
| 3,056,228 | 10/1962 | Stackhouse | 43/42.51 |
| 3,229,407 | 1/1966 | Quyle | 43/42.5 |
| 3,382,600 | 5/1968 | Walters | 43/42.15 |
| 3,492,755 | 2/1970 | Sunblad | 43/42.16 |
| 4,507,892 | 4/1985 | Ochs | 43/42.18 |

*Primary Examiner*—Nicholas P. Godici
*Assistant Examiner*—James Miner
*Attorney, Agent, or Firm*—Sim & McBurney

[57] ABSTRACT

A fishing lure comprising a first flat spoon portion of predetermined length bent at an obtuse angle along a first transverse fold line, a second flat spoon portion of similar predetermined length bent at a pair of obtuse angles along respective transverse fold lines to form a generally stepped shape, and two orthogonally disposed welded rings connected to respective ones of the first flat spoon portion and second flat spoon portion, for restricting rotational movement of the second flat spoon portion to approximately 180° relative to the first flat spoon portion.

8 Claims, 2 Drawing Sheets

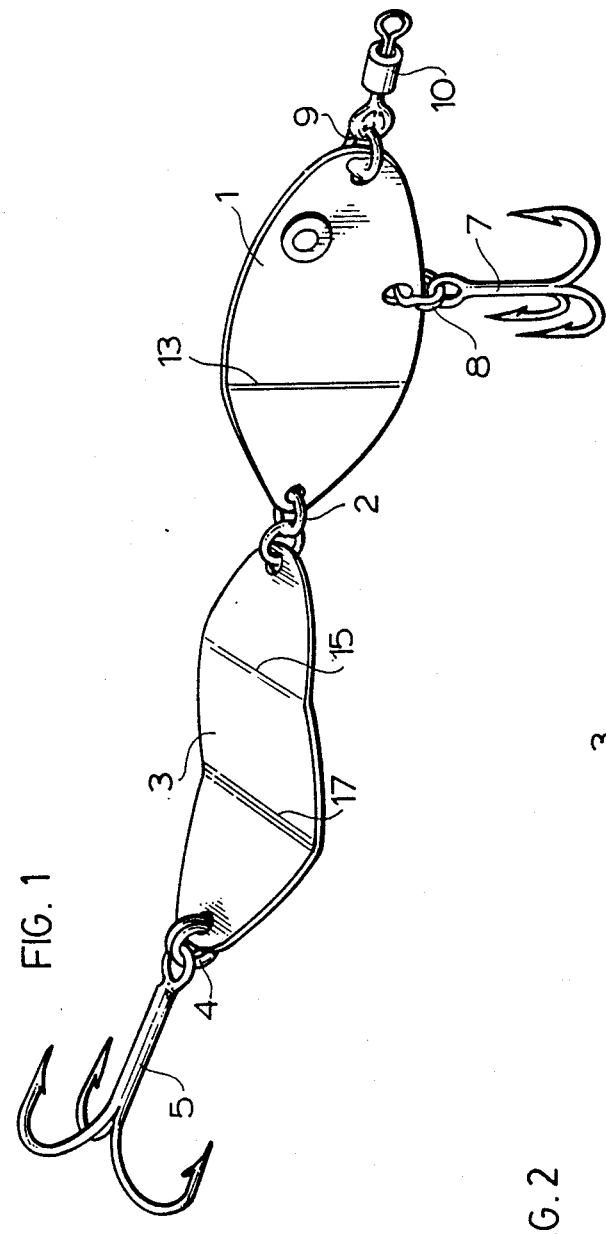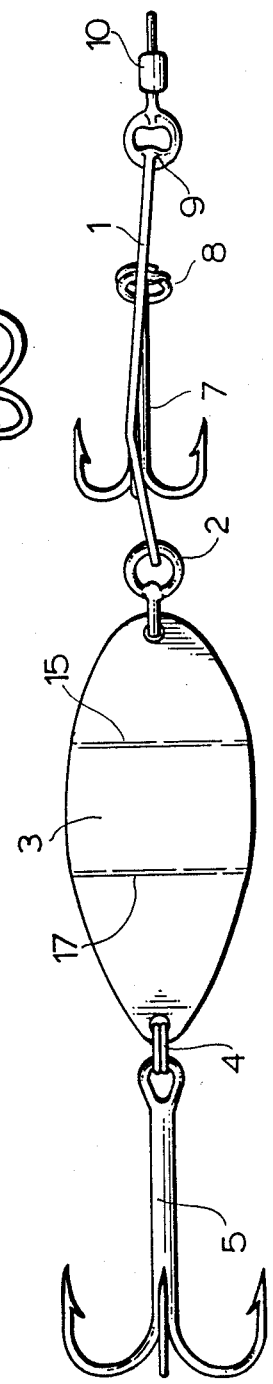

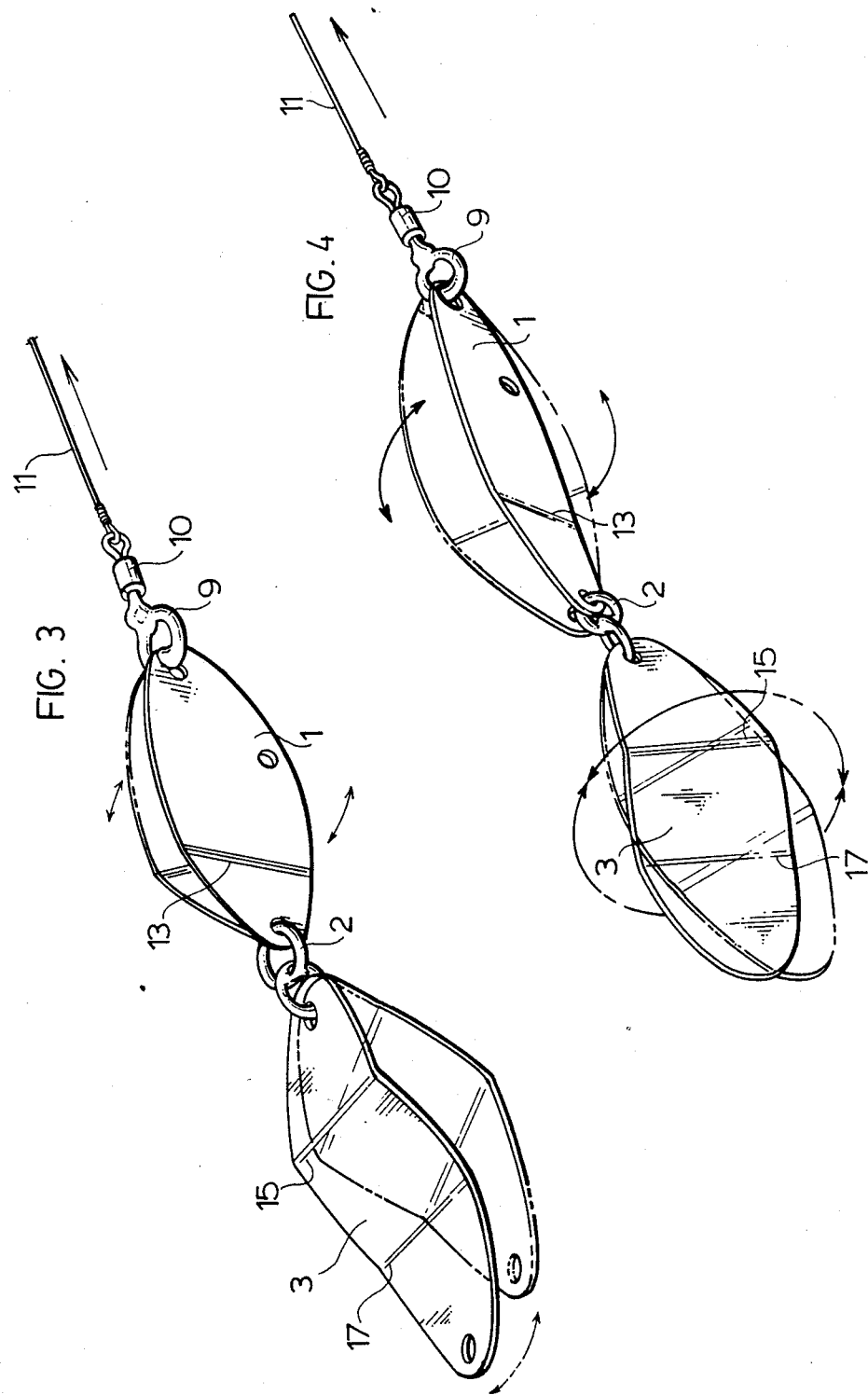

FISHING LURE

BACKGROUND OF THE INVENTION

This invention relates in general to fishing lures and more particularly to a fishing lure for resembling the action of a frightened minnow fleeing from an aggressor.

Prior art fishing lures have been developed for attracting the attention of fish by use of distinctive reflective and brightly coloured spoons which spin when trolled through the water. Such prior art lines are generally referred to as "flash bait". Additional prior art lures have been developed which use minnow-shaped members (typically formed from balsa wood or plastic) which are shaped such that the lure wiggles when trolling, thereby attracting the attention of or otherwise agitating fish. Such latter prior art lures are known generally in the art as "body bait".

For example, U.S. Pat. No. 4,507,892 (Ochs) discloses a fishing lure comprising two plates disposed in substantially perpendicular planes. The plates are bent so as to create a surface having a curve at right angles to the direction of motion. The two plates are connected by means of a stiff wire which maintains the plates substantially perpendicular to each other. This relationship causes a fluttering or wiggling motion of the first plate in a horizontal direction and of the second plate in a vertical direction. The combination of the two motions is set to create a considerable stir in the water which captures the attention of the fish.

U.S. Pat. No. 3,492,755 (Sundblad) discloses a trolling lure comprising generally rectangular forward, intermediate and rear sheet material strips of embossed aluminum coloured on opposite sides with a contrasting colour. The lure is joined at one end by a forward conventional swivel to a rudder which in turn is joined to the fishing line, and at the other end is joined through a rear conventional swivel to a leader having a hook or plurality of hooks connected thereto. Each of the strips incorporates an obtuse angle bend, the angles of successive ones of the bends being oriented in opposite directions. In response to trolling the lure through the water, a compound motion is produced by the dihedrally related end portions of each of the strips acting on the water, resulting in a wiggling motion proportional to the speed of trolling.

U.S. Pat. No. 3,056,228 (Stackhouse) discloses a flash bait fish lure comprising a generally flat member bent along two fold lines at opposite obtuse angles, forming a generally stepped configuration or shape. The obtuse angle bends contribute to execution of a spinning action when trolled at a fast trolling velocity, a flipping action when trolled at normal trolling velocity and a dodging action when trolled at a slow trolling velocity. The spinning action and the flipping action both comprise complete rotation of the lure about an axis extending along the direction of trolling motion.

U.S. Pat. No. 2,895,253 (Hess) teaches a fishing tackle comprising a piece of thin sheet material having four attachment points located near the edges and arranged to form the corners of an equilateral figure, and four vanes, each extending from a surface of the piece parallel to the line of adjacent attachment points, alternate vanes extending from opposite surfaces of the piece. Each of the four vanes acts in imparting a spinning motion to the lure when it is pulled through the water by a line connected directly or indirectly to one of the attachment points. The fishing tackle of Hess provides a spinner whose colour and action are changeable by the mere changing of position of one or more spinner elements in the lure, thus making it unnecessary for the fishermen to purchase more than one spinner to secure a variation of effects which are attractive to fish.

U.S. Pat. No. 2,835,067 (Tidwell) discloses a stepped fish lure in which the leading portion of the lure is positioned in a plane spaced above the trailing portion and in which the leading and trailing portions are connected with a step providing a definite break between the two portions, whereby in retrieving the lure which has a tendency to move laterally in the water, the lure spins in a clockwise direction as it moves toward the right side and in a counterclockwise direction as it moves toward the left side.

U.S. Pat. No. 2,608,787 (Krogue) discloses a fish lure comprising an elongated plate having straight front and rear transverse edges and bevelled corners, the plate including a flat intermediate portion, a forwardly and upwardly extending front portion and a rearwardly and downwardly extending rear portion, the intermediate front and rear portions having straight lateral edges, and a pair of flat tongues struck out from the respective front and rear portions of the plate in constituting longitudinal and coplanar continuations of the respective front and rear ends of the intermediate portion, the tongues being provided with apertures for attachment to a fishing line and a fish hook leader respectively. The configuration of the Krogue fish lure is particularly adapted to attracting large fish in that axial rotating movement is eliminated and replaced by travel in a zig-zagged path for creating an intense visual impression on the fish.

All of the above-discussed prior art patents disclose flash bait fishing lures comprising plate sections or spoons of various configurations which coact or cooperate to produce spinning or wiggling motion which is intended to attract the attention of fish. Predetermined ones of the prior art patents contemplate a specific wiggling movement of the lure for mimicking the swimming motion of a fish in distress.

However, none of the above prior art lures combine the specific advantages of flash bait lures with the enhanced swimming action of a body bait lure.

SUMMARY OF THE INVENTION

It is an object of an aspect of the present invention to provide a fishing lure which combines the advantages of flash bait and body bait lures resulting in enhanced attractiveness of the lure to fish.

According to the present invention, a fishing lure is provided characterized by high reflectivity for attracting the attention of fish, as well as at least two visually distinct swimming actions. According to the first action, the lure adopts a gentle wiggling motion when trolled at slow speed for mimicking the normal swimming action of a minnow or other small fish. However, in response to trolling the fish lure of the present invention at a high trolling speed, the lure adopts a second more vigorous swimming action resembling the swimming movement of a frightened minnow fleeing from an aggressor.

Thus, by carefully controlling the speed at which the fishing lure of the present invention is trolled, the action of the lure can be made to resemble either the normal swimming action of a fish or the frightened swimming action of a fleeing fish.

The selective ability to switch between swimming actions in accordance with the fishing lure of the present invention has been found to attract the attention of fish to a far greater extent than possible with prior art fishing lures. It is believed that the fish are more attracted to the genuine swimming action characterized by the instant fishing lure than to the artificial wiggling motion or constant swimming motion provided by prior art fishing lures.

Moreover, the combination of controllable swimming actions with bright reflectivity of the lure further enhances its attractiveness to fish.

In general, according to an aspect of the present invention, there is provided a fishing lure comprising a first flat spoon portion bent at an obtuse angle along a first transverse fold line, a second flat spoon portion bent at a pair of obtuse angles along respective parallel transverse fold lines to form a generally stepped shape, and means for connecting said second flat spoon portion at a substantially orthogonal orientation to said first flat spoon portion, thereby restricting rotational movement of said second flat spoon portion to approximately 180° relative to said first flat spoon portion.

DESCRIPTION OF THE DRAWINGS

A preferred embodiment of the present invention will be described herein below with reference to the following drawings, in which:

FIG. 1 is a perspective view of a fishing lure according to the preferred embodiment of the present invention;

FIG. 2 is a plan view of the fishing lure shown in FIG. 1;

FIG. 3 is a perspective view showing oscillatory motion of first and second spoon portions of the fishing lure of FIGS. 1 and 2 when trolled at slow speed;

FIG. 4 is a perspective view showing oscillatory motion of the first and second spoon portions of the fishing lure of FIGS. 1 and 2 when trolled at high speed.

DESCRIPTION OF THE PREFERRED EMBODIMENT

Turning to FIGS. 1 and 2, the fishing lure of the present invention is shown comprising a first spoon portion 1 connected by means of welded rings 2 to a second spoon portion 3. A three-prong hook 5 is connected to a rear portion of second spoon portion 3 via a further ring 4, and a smaller three-prong hook 7 is connected to a side portion of the first spoon portion 1 via a ring 8. A front part of the first spoon portion 1 is connected by means of a further welded ring 9 to a swivel 10 which is, in turn, connected to a fishing line 11.

The first spoon portion 1 is bent at an obtuse angle along a first transverse fold line 13. The second spoon portion 3 is tent at a pair of obtuse angles along respective parallel transverse fold lines 15 and 17 forming a generally stepped shape.

In operation, upon trolling the fishing lure at slow speed, the first spoon portion 1 has a tendency to plane vertically through the water. Meanwhile, the second spoon portion 3 is dragged through the water by the first spoon portion and has a tendency to swing or oscillate from side to side in a horizontal plane around a pivot point defined by the connection to welded ring 2, as shown in FIG. 3. At the same time, the hook 5 swings from side to side complementing the swinging motion of the second spoon portion, (not shown in FIG. 3).

The oscillatory motion of the second spoon portion 3 also imparts a gentle oscillatory motion to the first spoon portion 1 around an axis of rotation extending through the flat spoon portion in the direction of trolling.

Furthermore, the angle of the foremost bend 15 in the second spoon portion 3 is such that the nose of the spoon portion 3 points toward the ring 8, thereby urging the hook 7 to remain on the bottom of spoon portion 1 for stabilizing the vertical orientation of the spoon portion 1.

Thus, the overall action of the fishing lure at slow trolling speeds resembles that of a fish swimming normally through the water.

However, upon trolling the fishing lure at relatively high speed, the second spoon portion 3 has a tendency to spin around an axis of rotation extending longitudinally therethrough from the ring 4 to the rings 2. However, as a result of the welded rings 2 connecting the first and second spoon portions, the second spoon portion 3 is effectively restricted in its rotational movement to 180°. As a result, the second spoon portion 3 rotates 180° back and forth between successive vertical orientations around the aforementioned axis of rotation, as shown best with reference to FIG. 4.

The pronounced 180° oscillations of the second spoon portion 3 impart a twisting force via welded rings 2 to the first spoon portion 1, thereby causing the first spoon portion 1 to oscillate between greater angles from vertical (i.e. greater amplitude) than when the lure is trolled at slow speeds. The enhanced oscillatory motion of spoon portion 1 at high speeds is also shown in FIG. 4.

Meanwhile, the hook 5 (not shown in FIGS. 3 and 4) continues to swing or sway back and forth in a horizontal plane resembling the tail swimming action of a fish, and the hook 7 effectively tucks under the spoon portion 1 for stabilizing the motion thereof, as shown in the plan view of FIG. 2.

The overall visual impression of the fishing lure of the present invention when drawn at a high trolling speed is that of a frightened minnow fleeing from an aggressor.

Moreover, when the lure of the present invention is trolled at even higher speed, both spoon portions 1 and 3 eventually begin to spin at a high rate around the swivel 10, thereby adopting the action of a normal flash bait.

It has been found that the combination of highly reflective spoon portions and distinctive speed controlled swimming actions, and in particular the ability to mimic the normal and frightened swimming motions of a minnow, is particularly conducive to attracting the attention of fish.

The additional hook 7 is optional, and would not be utilized when casting the fishing lure. However, when used for trolling purposes, the additional hook 7 contributes to stability of movement of the first spoon portion 1 in the water, and furthermore enables side hits from approaching fish.

The combination of welded ring 9 connected to the front portion of spoon 1 enhances the planar motion of the first spoon portion 1 especially at slow trolling speeds. In particular, it has been found that the ring 10 serves to direct pulling pressure to the nose or front end of the fishing lure.

The swivel 10 serves to prevent twisting of the line 11, in the usual manner.

In summary, according to the present invention, a fishing lure is provided which incorporates a specific orientation or shape of spoon portions connected by means of a welded ring for restricting rotational movement of the second flat spoon portion to approximately 180° relative to the first flat spoon portion. The resulting swimming action of the lure is one which can be controllably alternated between that resembling normal swimming motion of a minnow and that resembling a frightened swimming motion of a minnow fleeing from an aggressor.

Other embodiments and variations of the present invention are possible.

For example, the welded rings 2 need not be round, but could be pear-shaped or any other suitable shape. Moreover, the welded rings 2 could in practice be replaced by twisted wire (e.g. in a figure-eight configuration) or other rigid attachment. However, the essential requirement for the rings 2 or other rigid attachment is that they must be oriented at 90° to each other and that the holes or apertures in the nose and tail portions of the spoons 1 and 3, respectively, through which the rings 2 extend must be sufficient to permit only 90° rotation of the respective ones of the spoons 1 and 3 relative to the rings 2.

The additional ring 9 can be optionally eliminated, in which case the swivel 10 would be connected directly to the first spoon 1. However, the ring 9 is preferably included to provide additional directing of the pulling pressure from line 11 to the front of the lure, as well as to contribute to easy manufacturing of the lure.

Furthermore, the hooks 5 and 7 can be of various sizes and configurations depending on the variety of fish being caught as well as personal preference, etc.

All such modifications and embodiments are believed to be within the sphere and scope of the present invention as defined by the claims appended hereto.

I claim:

1. A fishing lure, comprising:
   (a) a first flat spoon portion bent at an obtuse angle along a first transverse fold line,
   (b) a second flat spoon portion bent at a pair of obtuse angles along respective parallel transverse fold lines to form a generally stepped shape, and
   (c) means for connecting said second flat spoon portion at a substantially orthogonal orientation to said first flat spoon portion and restricting rotational movement of said second flat spoon portion to approximately 180° relative to said first flat spoon portion, wherein said means for connecting comprises a pair of orthogonally oriented rings rigidly connected together, a first one of said rings extending through said first flat spoon portion, and a second one of said rings extending through second flat spoon portion.

2. A fishing lure as defined in claim 1, further comprising a hook connected to a distal end of said second flat spoon portion.

3. A fishing lure as defined in claim 2, further comprising an additional hook connected to one side of said first flat spoon portion.

4. A fishing lure as defined in claim 1, wherein said first transverse fold line is disposed approximately two thirds the length of said first flat spoon portion from front to rear for causing said first flat spoon portion to plane vertically when trolled through water.

5. A fishing lure as defined in claim 1, wherein said respective parallel transverse fold lines are disposed approximately one third and two thirds respectively the length of said second flat spoon portion from front to rear for causing said second flat spoon portion to swing from side to side in a horizontal plane when drawn through water in a predetermined direction at a slow trolling speed, and for urging said second spoon portion to spin around an axis of rotation extending in said predetermined direction, said second spoon portion being limited by said means for connecting to successive clockwise and counter-clockwise rotations of 180° between successive substantially vertical orientations, and said second spoon portion imparting a twisting force via said means for connecting for causing said first spoon portion to oscillate at small angles from vertical around an axis of rotation extending in said predetermined direction.

6. A fishing lure as defined in claim 1, further including an additional swivel welded to a ring which is further welded on one side to the front of said first flat spoon portion, said swivel being connected at an opposite side to a fishing line for drawing said fishing lure through water.

7. A fishing lure as defined in claim 1, further including brightly coloured patterns applied to said first and second flat spoon portions.

8. A fishing lure as defined in claim 1, wherein said first flat spoon portion and said second flat spoon portion are fabricated from highly reflective material.

* * * * *